US012576665B2

(12) United States Patent
Yu et al.

(10) Patent No.: US 12,576,665 B2
(45) Date of Patent: Mar. 17, 2026

(54) VESSEL FOR USE IN MULTIPLE POSITIONS AND METHODS OF USE

(71) Applicant: PALETTERA HOLDINGS INC., Markham (CA)

(72) Inventors: Raymond Yu, Scarborough (CA); Jimmy Yu, Markham (CA)

(73) Assignee: Palettera Holdings Inc., Markham (CA)

( * ) Notice: Subject to any disclaimer, the term of this patent is extended or adjusted under 35 U.S.C. 154(b) by 305 days.

(21) Appl. No.: 18/216,798

(22) Filed: Jun. 30, 2023

(65) Prior Publication Data

US 2025/0001797 A1 Jan. 2, 2025

(51) Int. Cl.
*B43L 25/00* (2006.01)
*B65D 23/04* (2006.01)

(52) U.S. Cl.
CPC ........... *B43L 25/002* (2013.01); *B43L 25/007* (2013.01); *B65D 23/04* (2013.01)

(58) Field of Classification Search
CPC ..... B43L 25/002; B43L 25/007; B65D 23/04; B65D 21/0222
See application file for complete search history.

(56) References Cited

U.S. PATENT DOCUMENTS 4,288,000 A * 9/1981 Luker .................. B65D 21/022 206/508
5,125,538 A * 6/1992 Morris, Sr. ........ B65D 21/0231 222/545
6,484,900 B1 * 11/2002 Stiner ........................ F17C 1/16 220/583
9,784,405 B1 10/2017 Bushkovskiy
2006/0261065 A1 * 11/2006 Claypool ............. B65D 43/021 220/780
2009/0166240 A1 * 7/2009 Scarola ..................... B65D 1/40 206/524.2
2009/0166369 A1 * 7/2009 Savicki .............. B65D 43/0218 220/781
2025/0001797 A1 * 1/2025 Yu ....................... B65D 21/0222

FOREIGN PATENT DOCUMENTS

DE 20308127 U1 * 11/2003 ............. B65D 77/28
DE 102006005064 A1 * 8/2006 ......... B65D 21/0222
EP 3686120 A1 7/2020

* cited by examiner

*Primary Examiner* — Bob Zadeh

(57) ABSTRACT

An inkwell apparatus comprises an inkwell vessel and a cap for covering a vessel opening in an apparatus storage position. The cap has a protruding tip upon which to support the inkwell in an apparatus spinning position or a pooling position. A bottom (e.g. support surface) of the inkwell forms at least one of: i) a central region providing a tip engaging surface dimensioned to receive the tip in the spinning position; or ii) at least one tip engaging latch surface, each tip engaging latch surface dimensioned to receive the tip in the pooling position. Methods of use relate to the spinning position and the pooling position. The cap can comprise a seal ring to seal the opening or to provide support assistance in the spinning or pooling position(s). Ribs in the inkwell can provide deflection of ink when stirred such as by spinning.

22 Claims, 8 Drawing Sheets

VESSEL FOR USE IN MULTIPLE POSITIONS AND METHODS OF USE

FIELD OF INVENTION

This disclosure relates to vessels including inkwells, such as for use with fountain or dip pens, and more particularly to a vessel for use in multiple positions and methods of use.

BACKGROUND

Writing and art tools comprise a wide selection of devices, both contemporary and historic. While such tools are inherently functional in nature, tool features can improve user engagement and seek to inspire creativity. For at least some users, contemporary tools include what one might think of as historic devices. Such devices include dip pens, fountain pens and ink storage vessels such as inkwells.

Dip pens have no ink reservoir while fountain pens have small refillable reservoirs. To use the ink in the inkwell, a nib of the pen is placed into the ink. Due to ink's fluidic nature, as the volume of ink reduces, it can be difficult to obtain a sufficient quantity from a bottom of the inkwell. It is also often desired to mix the ink in the inkwell. Ink can be stirred to obtain a more even consistency in the properties of the ink, including shimmering and non-shimmering inks.

It is desired to provide an improved vessel such as an inkwell.

SUMMARY

An inkwell apparatus comprises an inkwell vessel and a cap for covering a vessel opening in an apparatus storage position. The cap has a protruding tip upon which to support the inkwell in an apparatus spinning position or a pooling position. A bottom (e.g. support surface) of the inkwell forms at least one of: i) a central region providing a tip engaging surface dimensioned to receive the tip in the spinning position; or ii) at least one tip engaging latch surface, each tip engaging latch surface dimensioned to receive the tip in the pooling position. Methods of use relate to the spinning position and the pooling position. The cap can comprise a seal ring to seal the opening or to provide support assistance in the spinning or pooling position(s). Ribs in the inkwell can provide deflection of ink when stirred such as by spinning.

BRIEF DESCRIPTION OF DRAWINGS

FIGS. 18A to 18C are illustrations of representative alternative inkwell wall shapes in accordance with respective embodiments.

DETAILED DESCRIPTION

Figure 1:
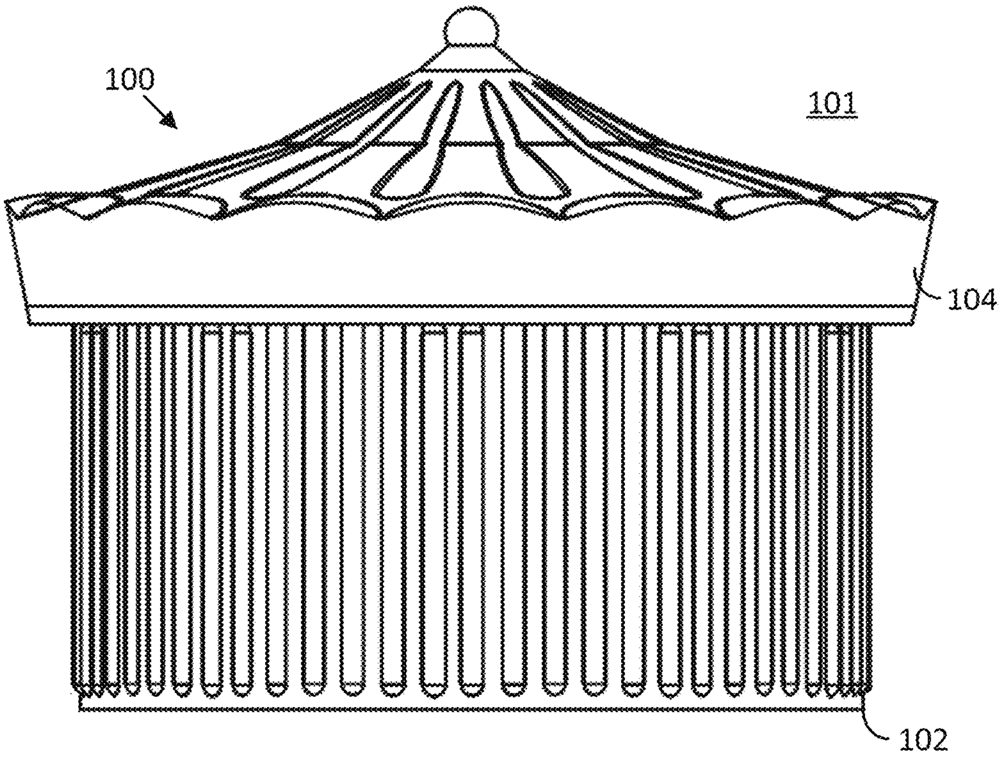
FIG. 1 is a side view of vessel, namely an inkwell with a cap shown assembled in a first use position, in accordance with an embodiment.

FIG. 1 is a side view of a vessel 100, namely an inkwell 102 with a cap 104 shown assembled in a first use position, in accordance with an embodiment. The first use position defines a storage position 101 such as to store ink (not shown) within inkwell 102.

Figure 2:
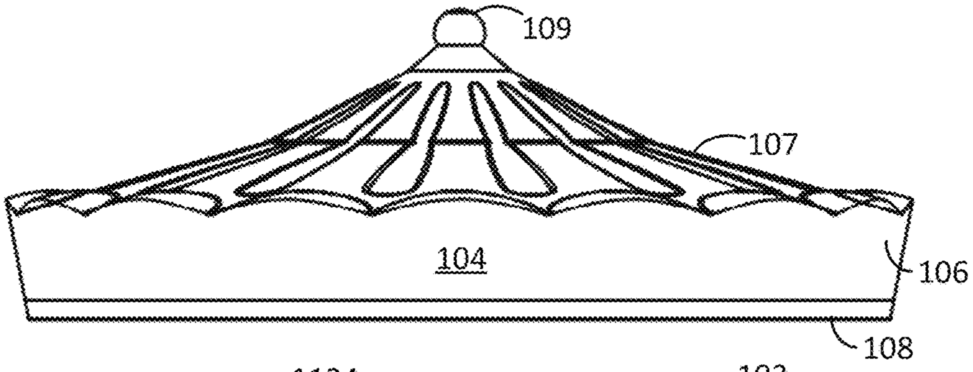
FIGS. 2 and 3 are respective side views of the cap and the inkwell of FIG. 1.

FIG. 2 is a side view of cap 104 showing a top component 106 and a bottom component 108. Top component 106 comprises a metal material such as aluminum. Top component 106 can be formed in a conventional manner. In an embodiment cap 104 includes ornamental design features of the article such as shape, pattern, configuration and other ornamentation (e.g. color, etc.) providing a decorative and fanciful article. Other materials such as wood, a stiff plastic or glass can be used and formed as applicable. In the present embodiment, and without limitation, cap 104 is approximately 44 mm (~1.73") in exterior diameter and 40 mm (~1.57") in interior diameter, and cap 104 is approximately 51 mm (~2.0") in exterior diameter. As used herein, exterior and interior are generally relative to the interior and exterior of the vessel. The interior of the vessel is useful to store and present ink and comprises generally the volume below opening 103. An interior surface of the cap thus generally faces the interior of the vessel such as when in a storage position and the exterior of the cap is opposite to the interior surface of the cap and generally faces away from the interior of the vessel in a storage position. The exterior of the cap may face a bottom exterior surface of the vessel such as when in one of the second or third use positions as further described herein.

In the present embodiment, without limitation, the vessel as a whole is ornamented to present as a carousel, or merry go round, for example, but absent any horses, mounts or other seat types for patrons. Exterior surface 107 of top component 106 simulates roof of the carousel and provides a central tip 109 protruding from the surface 107. The tip 109 simulates a finial at the apex of the simulated roof. Tip 109 provides a spinning point, as described further herein with respect to use positions and methods of use. Exterior surface 109 is generally conical in shape. Exterior surface 109 and a bottom exterior surface 105 of inkwell 102 are cooperative such that they are relatively shaped to marry with one another, as further described herein below with reference to FIG. 13. Bottom exterior surface 105 provides a support surface for the inkwell for example for supporting the inkwell on (another support surface) such as a table, desk, etc.

Bottom component 108 comprises a thermoplastic rubber (TPR) material in accordance with an embodiment. TPR are compounds formulated using Styrene-Butadiene-Styrene (SBS) or Styrene-Ethylene/Butylene-Styrene (SEBS) block copolymers, for example. Bottom component 108 is useful to provide sealing engagement with inkwell 102 or a stabilizing surface each as described further. Bottom component 108 defines a sealing ring or gasket of resilient but flexible material for frictionally sealing the cap and inkwell.

Figure 3:
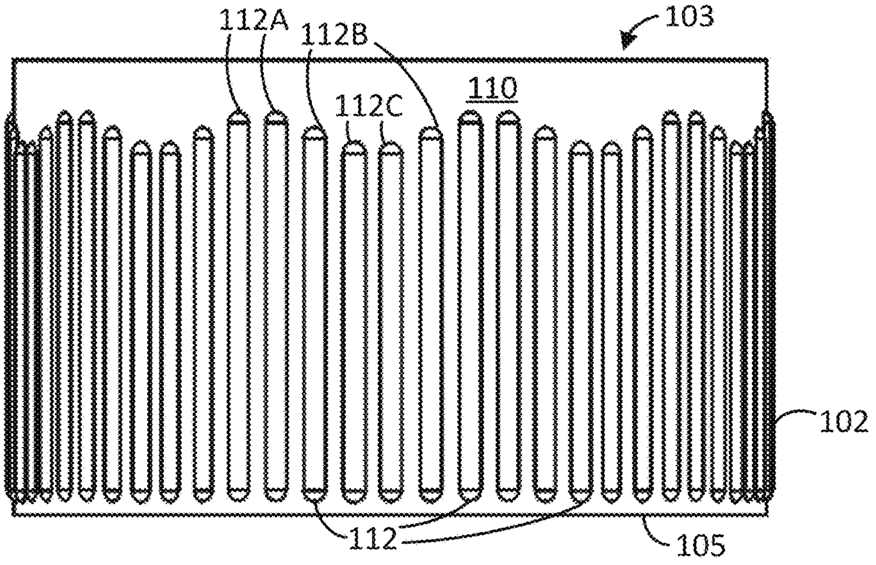

FIG. 3 is a side view of inkwell 102 of FIG. 1. Inkwell 102 comprises a glass material, for example. Inkwell is formed such as by press moulding. Preferably the inkwell material is non-reactive with ink. Inkwell 102 is generally circular in cross-section when viewed from a top and comprises a vessel wall 110 extending from a base, generally around a periphery of the base. The base forms a base exterior surface 105. Vessel wall 110 carries a plurality of spaced ridges 112 about the circumference of the inkwell, each of the ridges extending from a base end of the wall 110 toward a rim end of the wall 110, each ridge ending with a respective tip (e.g. 112A, 112B, 112C). The length of the ridges 112 is varied in the present embodiment, without limitation, for example to simulate poles of a carousel. Three lengths are shown in the present embodiment. Tips 112A represent ridges 112 of the longest length, tips 112B represent ridges 112 of a medium length, and tips 112C represent ridges 112 of a shortest length. Ridges of even length or more different lengths may be used. Ridges 112 provide grip surfaces to assist with gripping the inkwell. Gripping assistance may improve a spinning operation as further described. In an embodiment, the ridges 112 can have at least some tips 112A that extend to fit within bottom component 108 when the cap 104 is secured to the inkwell.

Figure 4:
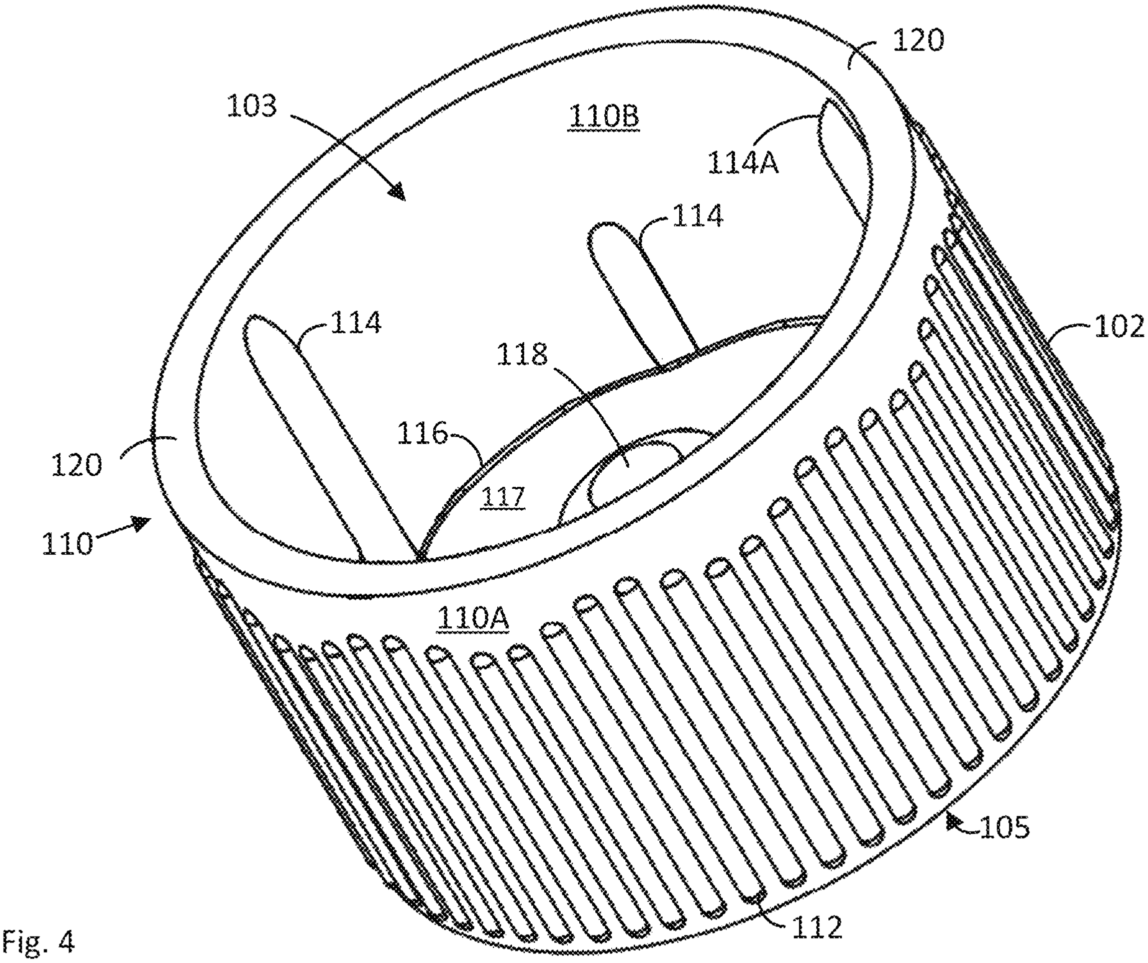
FIG. 4 is front isometric view of a tilted inkwell of FIG. 1 showing contours of a vessel interior.
Figure 5:
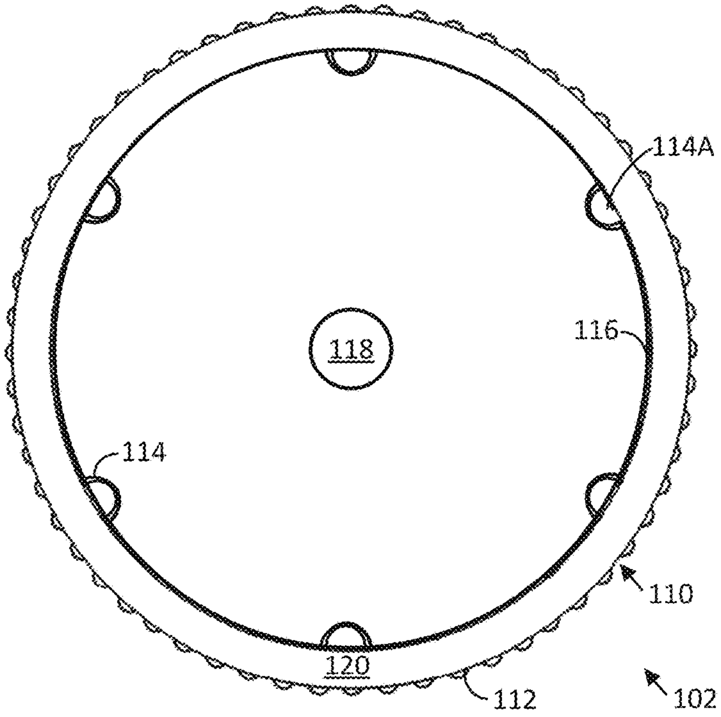
FIG. 5 is a top view and FIG. 6A is a bottom view of the inkwell of FIG. 1.
Figure 6A:
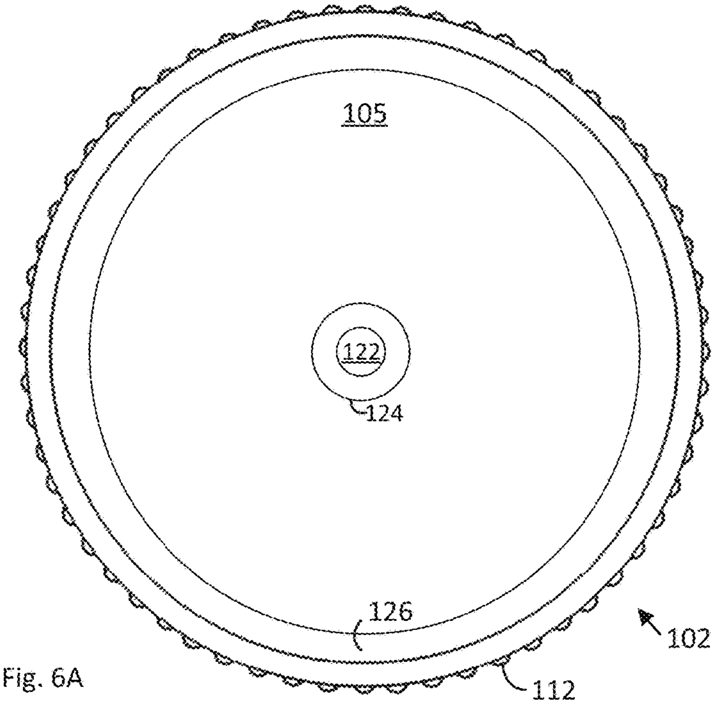
Figure 6B:
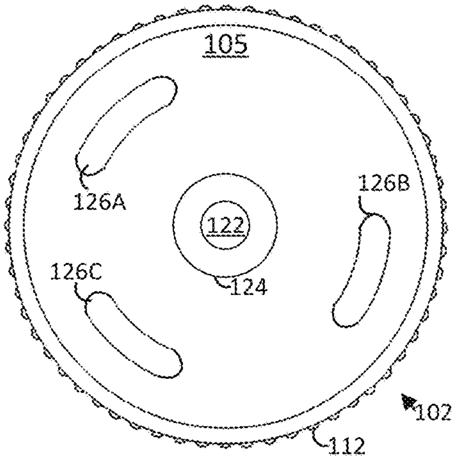
FIG. 6B, shown in a reduced scale, is a bottom view of the inkwell in accordance with an alternative embodiment.

FIG. 4 is a front isometric view of inkwell 102 shown in a tilted position to present contours of the vessel interior. FIG. 5 is a top view and FIG. 6A is a bottom view of the inkwell of FIG. 1. FIG. 6B, shown in a reduced scale, is an alternative embodiment of the bottom of inkwell 102.

Vessel wall 110 comprises an exterior surface 110A from which the plurality of ridges 112 protrude, and an interior surface 110B from which a plurality of ribs 114 protrude. In the present embodiment, there are six (6) ribs evenly spaced annularly about the interior surface, extending at least partially between an edge 116, where vessel wall 110B meets an interior (e.g. bottom) surface 117 of the inkwell, and the top end of the wall 110. Interior surface 117 is generally opposite an opening of inkwell 102. More or fewer ribs 114 may be used. Ends (e.g. 114A) of the ribs 114 taper toward interior surface 110B. The ribs 114 are of two heights, one being about 50%-60% shorter than the longer rib and the long and short ribs alternate about the interior circumference of the inkwell 102. Ribs 114 provide deflection surfaces for stirred ink within the inkwell as described further. Thus, the ribs are spaced along vessel wall, ribs extending at least partially between the vessel bottom and the opening opposite the vessel bottom.

Figure 12:
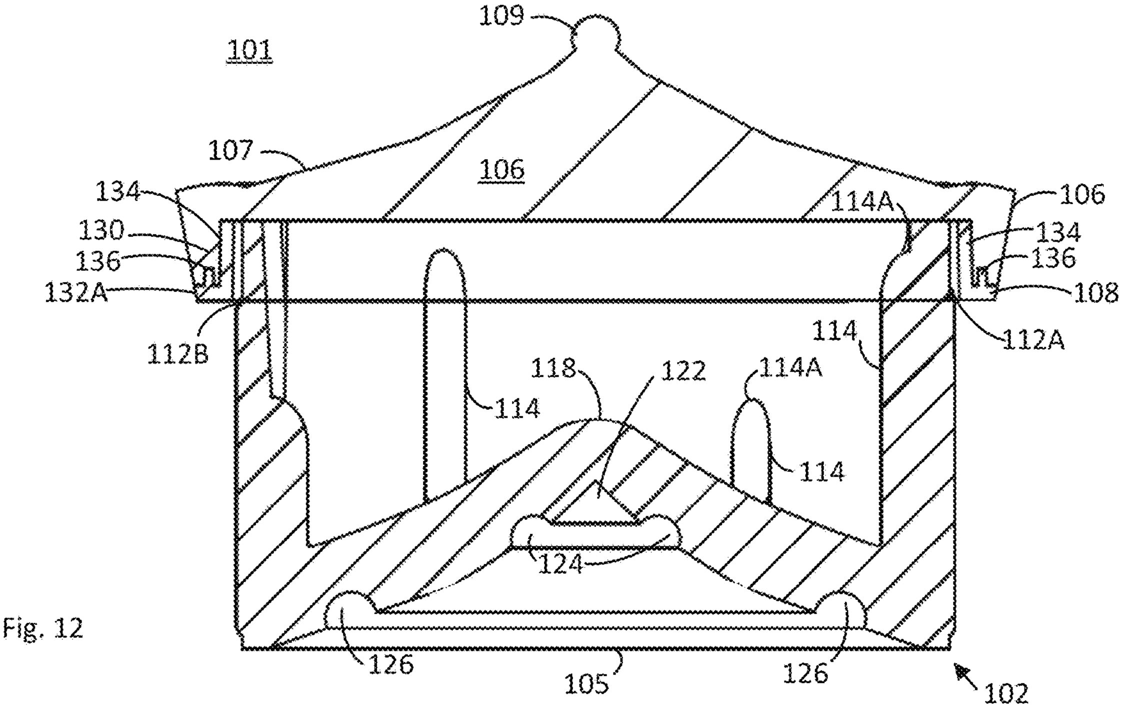
FIG. 12 is a cross-sectional view of the vessel of FIG. 1 in the first use position.
Figure 13:
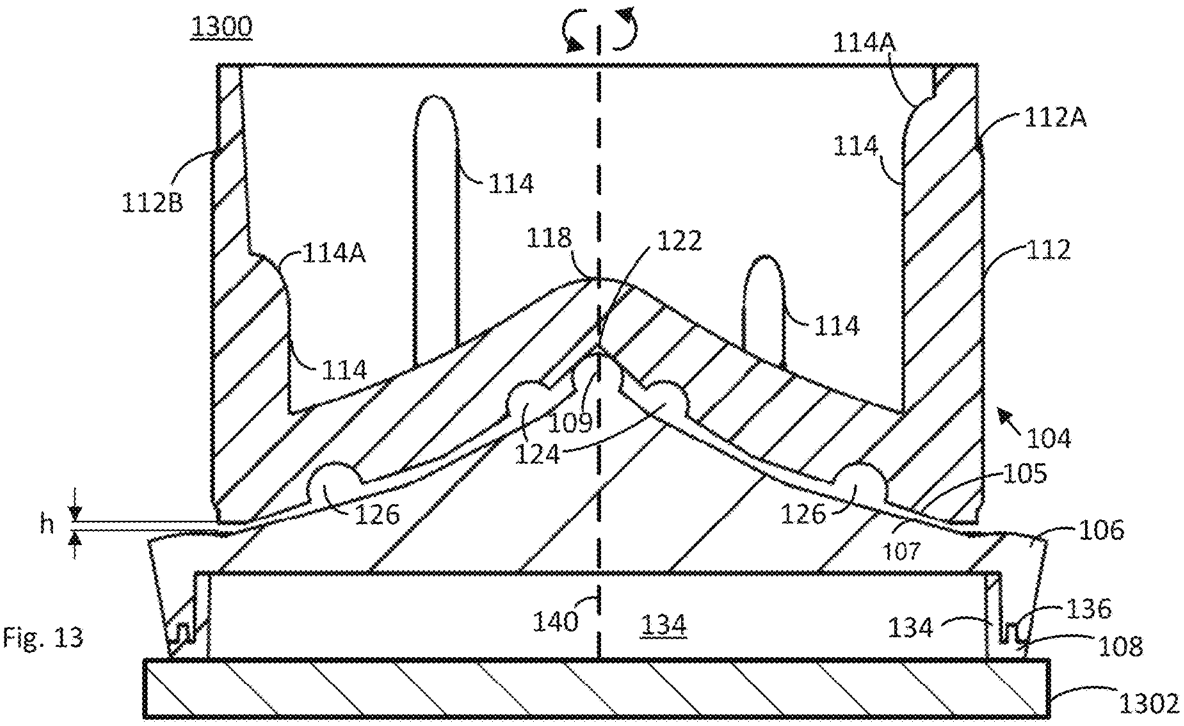
FIG. 13 is a cross-sectional view of the vessel of FIG. 1 in which the inkwell is positioned on the cap in a second use position, in accordance with an embodiment.

With additional reference to FIGS. 12 and 13, in the present embodiment, the interior surface 117 is generally conical or domed in shape and slopes from a central region 118 toward edge 116, similar to a bottle punt or dimple. Interior surface 117 is generally opposite an opening of inkwell 102. The sloped shape of the bottom surface can assist with pooling of ink toward edge 116. In an embodiment, (not shown) interior surface 110B is contoured (e.g. at 119) about edge 116 and each rib 114 to avoid sharp angles. Contouring can avoid corners where ink may be trapped. Contouring can assist with ink deflection.

Vessel wall 110 presents a rim 120 atop the wall 110, between the exterior and interior surfaces 110A and 110B. Rim 120 generally defines the inkwell opening. Rim 120 can engage in a seal with bottom component 108 of cap 104.

FIGS. 6A and 6B show bottom exterior surface 105, which is generally conical in shape such as further shown in FIGS. 12 and 13. In FIG. 6A, bottom exterior surface 105 forms a central region 122 and two concentrically spaced (U-shaped) tracks or grooves 124 and 126 that extend annularly around the central region, also all as shown in FIGS. 12 and 13. Each of the grooves 124 and 126 are sized to accommodate a portion of tip 109 such as shown in FIGS. 12 and 13 to provide respective latch surfaces to engage the tip 109 therein. While shown as complete circles in FIG. 6A (i.e. they extend completely around the central region), one or both of the grooves may comprise one or more points or arc segments. FIG. 6B shows arc segments 126A, 126B and 126C for groove 126 in an alternative embodiment of the inkwell bottom. More or fewer segments or points may be used and differently sized, but nevertheless, sized to accommodate tip 109. While shown as a generally U-shaped groove to cooperate with a shape and dimension of tip 109, other shapes (e.g. V-shape) may cooperate with other tip shapes (e.g. a point like shape). Preferably the tip shape supports spinning and pooling actions.

Figure 7:
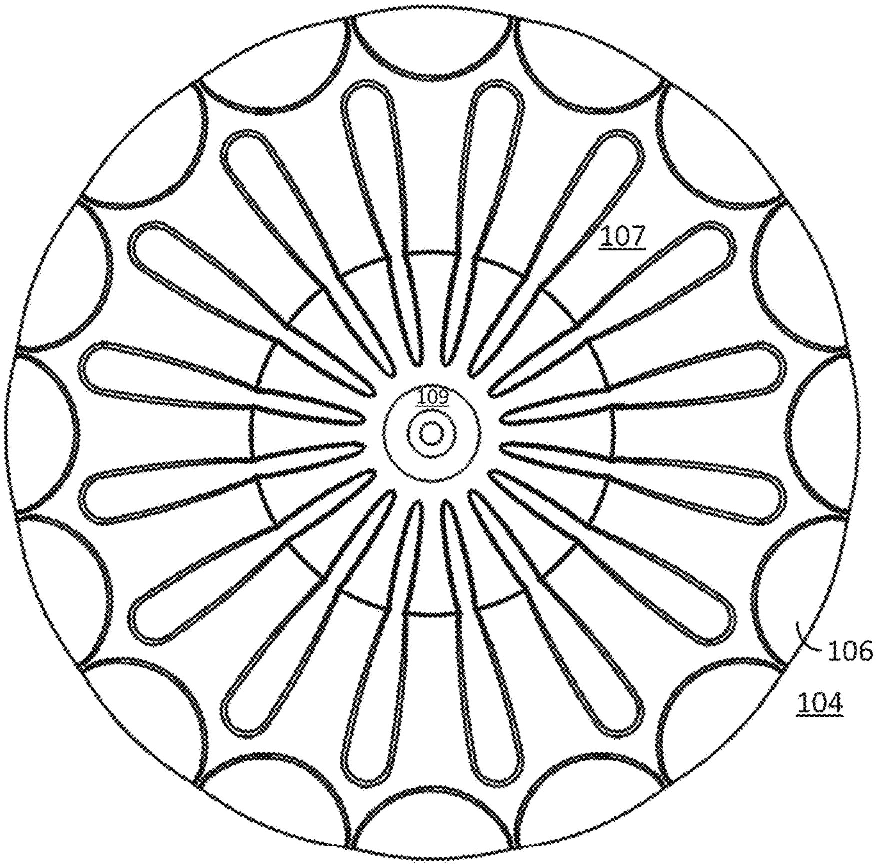
FIGS. 7, 8 and 9 are respective top, bottom and isometric views of the cap of FIG. 1.
Figure 8:
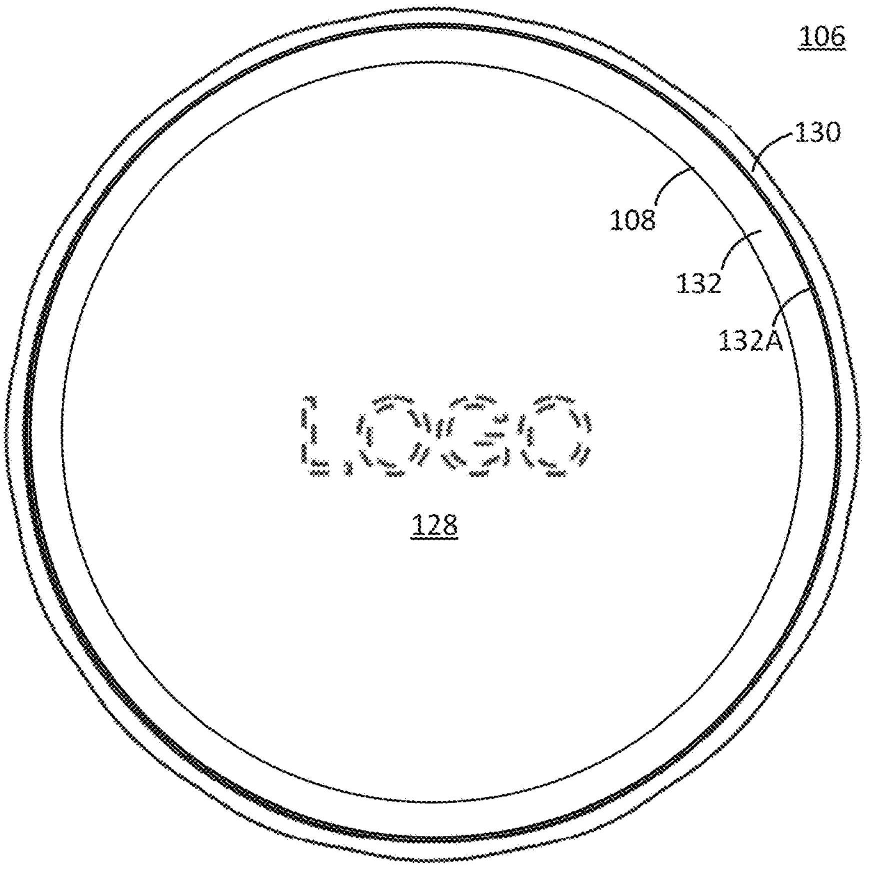
Figure 9:
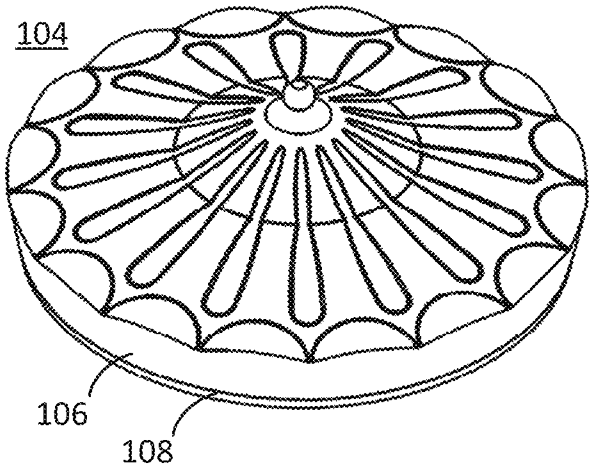

FIGS. 7, 8 and 9 are respective top, bottom and front isometric views of cap 104. Central region 128 of an underside of top component 106 can provide a surface for a logo or other information (e.g. via embossing or other technique). Bottom component 108 comprises a generally ring shape of TPR material to line a cap rim 130 (see too, FIGS. 10 and 12) of the top component 106.

Figure 10:
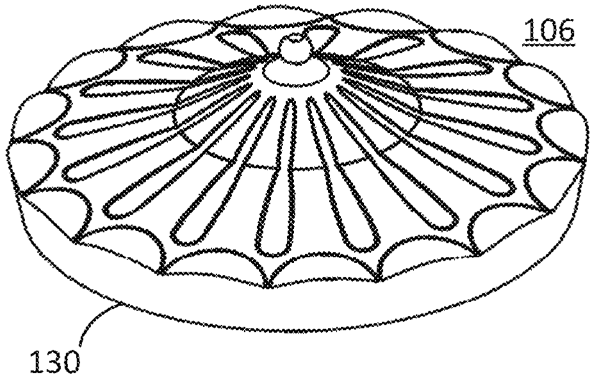
FIGS. 10 and 11 are respective front isometric views of a top component and a bottom component of the cap of FIG. 1 in accordance with an embodiment.
Figure 11:
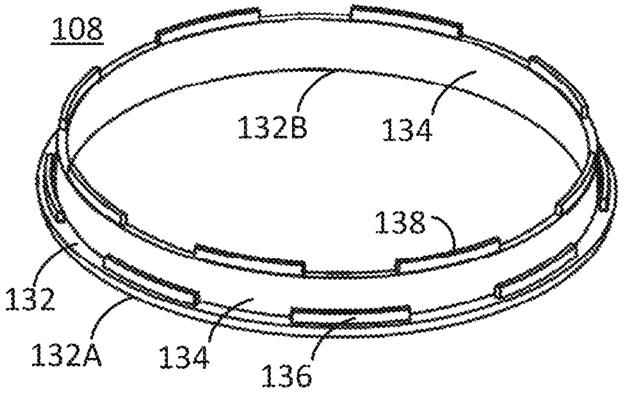

As noted, in the present embodiment, cap 104 comprises two components 106 and 108, which are assembled for of the cap. FIGS. 10 and 11 are respective front isometric views of top component 106 and bottom component 108 in accordance with respective embodiments. Bottom component 108 comprises a generally circular base 132 (having a exterior periphery 132A), and an annular wall 134 extending from and around the base 130, spaced inwardly from the periphery 132A, adjacent an interior periphery 132B of the base 132. A plurality of first tabs 136 (e.g. arcs in shaped and length) extend annularly around the base 132 in spaced end to end relation, positioned between the exterior periphery 132A and wall 134. A plurality of second tabs 138 similar to tabs 136 are spaced to extend annularly atop wall 134.

FIG. 12 is a cross-sectional view of the vessel of FIG. 1 in the first use position, namely as storage position 101. FIG. 13 is a cross-sectional view of the vessel of FIG. 1 in which the inkwell is positioned on the cap in a second use position, namely a spinning position 1300, in accordance with an embodiment. The cap is positioned on a support surface 1302 such as a table top. FIGS. 12 and 13 illustrate the coupling of the top component 106 and bottom component 108 of cap 104 as well as the shape of grooves 124 and 126 relative to tip 109. Grooves 124 and 126 (or any of the alternative tip engaging latch surfaces) are shaped and dimensioned in response to the shape and dimension of the tip 109, or vice versa.

FIG. 12 shows the ridge tip 112A within the bottom component 108 of cap 104. As noted, the bottom exterior surface 105 of inkwell 102 is generally conical in shape (e.g. domed), similar to a punt of a wine bottle. The shape of the exterior surface 107 of cap 104 and the bottom of inkwell 103 are cooperative, chosen to marry one another such as to permit spinning. FIG. 13 shows the inkwell atop the cap with the tip 109 in the central region of the bottom exterior surface 105. It is apparent that tip 109 protrudes sufficiently from surface 107 of top component 106 to support bottom exterior surface 105 (other than a portion of the central region 122 that is in contact with the tip 109) in a spaced relation to the exterior surface 109. A gap of height “h” is illustrated which is approximately 1 mm (~0.039"). Dotted line 140 presents a central axis of inkwell 102 and cap 104. Inkwell 102 can be (gently) spun about the axis 140, like a toy top, while supported by tip 109. Spinning serves to mix ink (not shown) in the inkwell using centrifugal forces, for example. The ribs 114 deflect and swirl the ink within the vessel interior.

For spinning position 1300, the cap is supported by support surface 1302 such as a table top or desk top or other support surface. Bottom component 108, e.g. comprising a TPR material, provides a stabilizing surface for spinning. The TPR material enhances friction, for example, compared to aluminum used in top component 106 in accordance with an embodiment.

A user may use at least some of the ridges 112 to grip the inkwell to initiate the spin, releasing after the spin force is applied. However ridges 112, or an alternative type of grip structure (e.g. to increase friction), are optional. In an embodiment, not shown, exterior surface 110A does not provide any additional grip structure or feature and is, for example, smooth all around. Other grip structures can be (optionally) provided, for example, indents or scallops, tabs, a plurality of raised dots or small bumps, etc.

Figure 14:
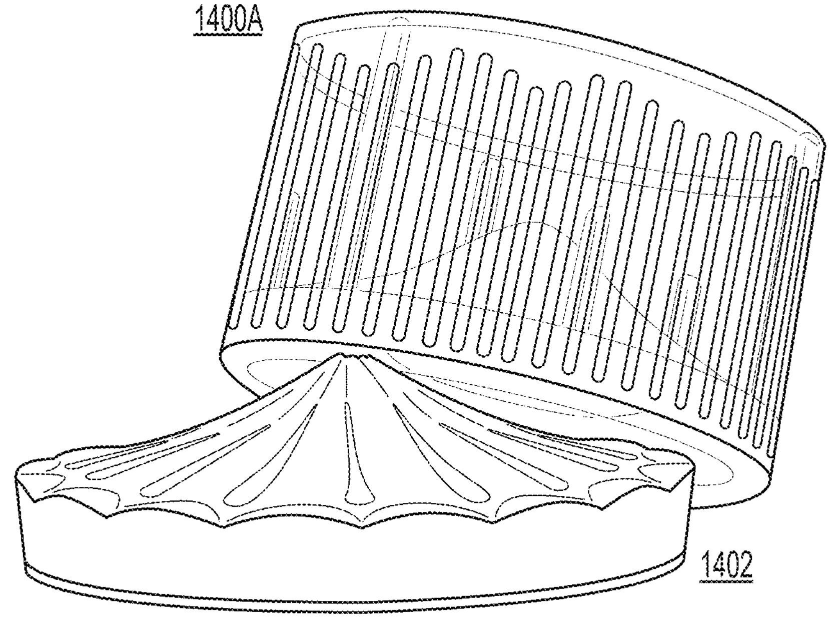
FIGS. 14 and 15 are illustrations from different viewpoints of the inkwell and cap of an embodiment of the vessel shown in a third use position, in accordance with an embodiment.
Figure 15:
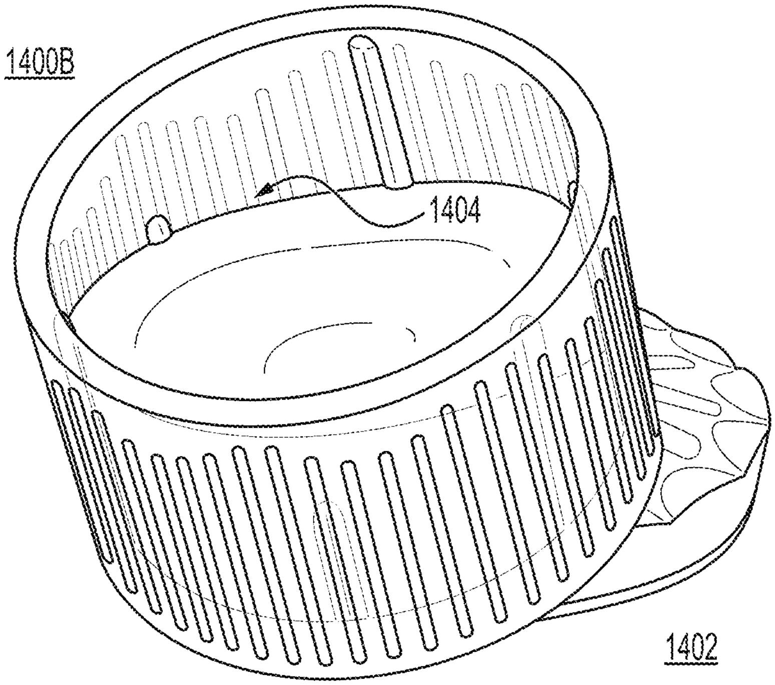

FIGS. 14 and 15 are photographs from different viewpoints of inkwell 102 and cap 104 of an embodiment of the vessel. The photographs show a third use position, namely a pooling position 1400A or 1400B to pool the ink, in accordance with an embodiment. For pooling position 1400A or 1400B, the cap and a portion of the inkwell are supported by a support surface such as a table top 1402, desk top, etc.

As seen in FIG. 13, tip 109 can be placed in either one of the tip engaging latch surfaces (e.g. grooves 124 (as in position 1400B) or 126 (as in position 1400A)). In an alternative embodiment, such as in FIG. 6B, grooves can comprise points or segments, as noted. The choice of which third position 1400A or 1400B to use can be made in response to the amount of ink 1404 in the well, selecting the groove to latch inkwell 102 at a larger or smaller angle.

Figure 16:
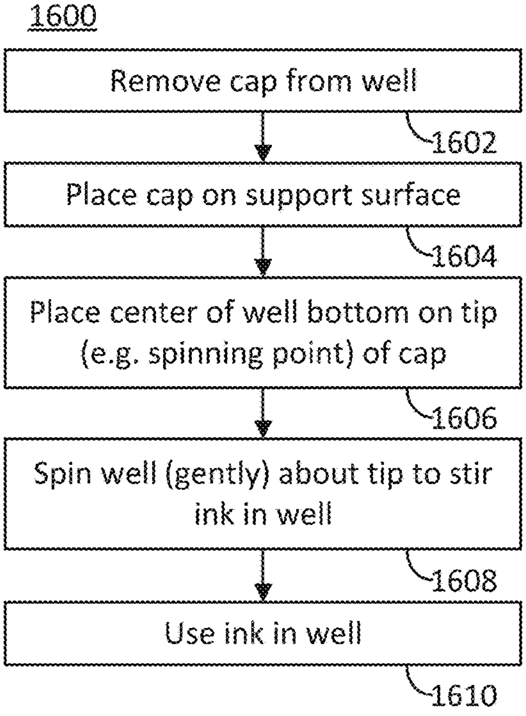
FIGS. 16 and 17 are flowcharts of methods of use in accordance with respective embodiments.
Figure 17:
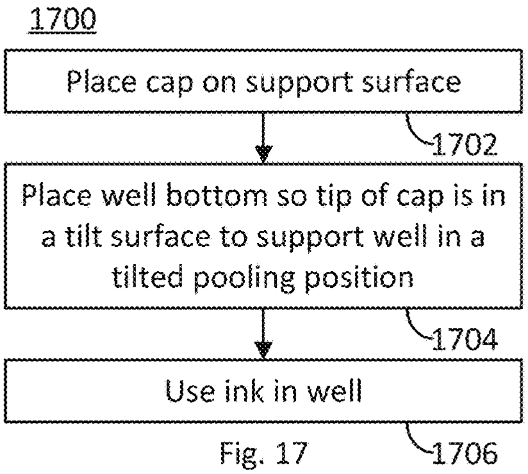

FIGS. 16 and 17 are flowcharts of methods of use in accordance with respective embodiments. It will be appreciated that some steps in any of the methods are optional or may be performed in a different order. FIG. 16 shows steps of a method to stir ink in inkwell 102. At 1602 the cap 104 is removed from inkwell 102. At 1604, cap 104 is placed on a support surface. At 1606, central region 122 of the well bottom exterior surface 105 is placed on tip 109 providing a spinning point of cap 104. At 1608, cap 104 is (gently) spun about the spinning point to stir ink 1404. Gentle spinning is preferred so as to not spill the ink. Inkwell 104 can be sufficiently under-filled to permit gentle stirring without spilling. At 1610, ink 1404 in the well 102 is used such as with a dip pen (not shown). Optionally, not shown, the inkwell is removed such, as prior or after step 1610 and placed on the support surface (or another). Ink 1404 can be used in this supported position of the inkwell 102.

FIG. 17 shows steps of a method to pool the ink 1404 in inkwell 102 such as about a portion of edge 116 therein. At 1702, cap 104 is placed on a support surface. At 1704, inkwell bottom (e.g. surface 105 via one of grooves 124 or 126 or other provided tip engaging latch surfaces or an alternative embodiment) is placed on tip 109 to support the well in the pooling position 1400A or 1400B (e.g. in a tilted supported position). The ink in well is used at 1706. A first pooling position may be used followed by a second pooling position as the ink volume is reduced. The cap may be placed on the inkwell for storage such as after use.

Figure 18A:
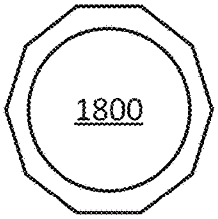
Figure 18C:
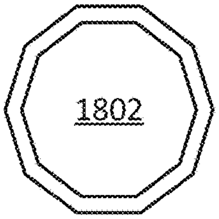
Figure 18C:
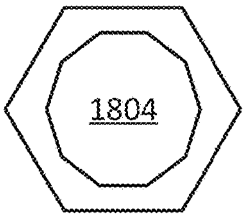

While vessel wall 110 is generally cylindrical in the illustrated embodiment (with interior ribs and exterior ridges), other shapes can be employed for the wall. For example, inkwell 102 may be many sided on the interior surface, the exterior surface or both. The number of sides need not be equal on the interior and exterior surfaces. For example, in an embodiment, inkwell 102 may have 12 sides or faces (not shown). FIGS. 18A to 18C show representative shapes 1800, 1802 and 1804 for a vessel wall 110. Ribs and or ridges or other gripping structures (not shown in FIGS. 18A to 18C) may be applied to the interior and exterior surfaces, for example.

While vessel wall 110 (e.g. rim 120) and bottom component 108 cooperate to seal ink within the well 102 as shown and described, other closure forms may be provided. In an embodiment, a stopper style form is provided where a portion of cap 104 fits within the opening defined by vessel wall 110. In an embodiment, vessel wall 110 is adapted with a threaded rim, like a threaded jar, and the cap has a cooperating rim for threaded attachment. The cap rim may be similarly lined such as shown in the embodiment of FIG. 1, adapted as may be applicable for a jar like lid.

(Statement 1:) There is provided an apparatus comprising: an inkwell defining an opening for ink; and a cap for covering the inkwell in a storage position; wherein the cap comprises a tip protruding from a cap surface; and a support surface of the inkwell forms at least one of: a central region providing a tip engaging surface dimensioned to receive the tip to provide a spinning position for the apparatus; or at least one tip engaging latch surface, each tip engaging latch surface dimensioned to receive the tip to provide a pooling position for the apparatus.

(Statement 2:) In an embodiment of the apparatus of Statement 1, the support surface of the inkwell and the cap surface are cooperative in shape to facilitate spinning the inkwell atop the tip in the spinning position.

(Statement 3:) In an embodiment of the apparatus of Statement 1 or 2, wherein each tip engaging latch surface comprises a groove that at least partially encircles the support surface of the inkwell to provide a selective pooling position.

(Statement 4:) In an embodiment of the apparatus of any of Statements 1 to 3, the cap comprises a sealing ring to provide: a seal for the opening in the storage position; and a stabilising surface for one or both of the spinning position or the pooling position.

(Statement 5:) In an embodiment of the apparatus of any of Statements 1 to 4, the apparatus has one or more gripping structures on an exterior surface of the inkwell.

(Statement 6:) In an embodiment of the apparatus of any of Statements 1 to 5, the inkwell comprises a domed shaped surface to direct ink toward an edge of the domed shaped surface.

(Statement 7:) In an embodiment of the apparatus of any of Statements 1 to 6, the inkwell comprises at least one vessel wall, and a vessel bottom generally opposite the opening, and wherein an interior surface of the inkwell defined by the at least one vessel wall comprises a plurality of ribs for deflecting stirred ink.

(Statement 8:) In an embodiment of the apparatus of any of Statements 1 to 7, the tip is located in a center of the cap.

(Statement 9:) In an embodiment of the apparatus of any of Statements 1 to 8, a shape of the cap simulates a roof structure and a shape of the tip simulates a roof finial structure.

(Statement 10:) A method for using an apparatus, wherein the apparatus is defined according to any one of Statements 1 to 9, the support surface of the inkwell comprises the central region providing the tip engaging surface, and the method comprises steps of: a) positioning the apparatus in the spinning position; and b) spinning the inkwell to stir ink in the inkwell.

(Statement 11:) In an embodiment of the method of Statement 10, the method comprises, prior to step a), positioning the cap on a support surface.

(Statement 12:) In an embodiment of the method of Statement 10 or 11, the method comprises, after step b), using the ink in the inkwell.

(Statement 13:) In an embodiment of the method of Statement 12, the method comprises, after the step of using the ink, positioning the apparatus in the storage position.

(Statement 14:) In an embodiment of the method of Statement 12 or 13, the support surface of the inkwell further comprises the at least one tip engaging latch surface and wherein the method comprises, after step b), positioning the apparatus in the pooling position.

(Statement 15:) In an embodiment of the method of Statement 14, at least one of: i) the inkwell comprises a domed shaped surface for directing ink to an edge of the dome shaped surface; ii) a tip engaging latch surface of the at least one tip engaging latch surface comprises a groove that at least partially encircles the support surface of the inkwell to provide a selective pooling position; iii) the support surface of the inkwell and the cap surface are cooperative in shape to facilitate spinning the inkwell atop the tip in the spinning position; iv) the apparatus comprises one or more gripping structures on an exterior surface of the inkwell; or v) the inkwell comprises at least one vessel wall, and a vessel bottom generally opposite the opening, and wherein an interior surface of the inkwell defined by the at least one vessel wall comprises a plurality of ribs for deflecting stirred ink.

(Statement 16:) In an embodiment of the method of Statement 10, at least one of: i) the support surface of the inkwell and the cap surface are cooperative in shape to facilitate spinning the inkwell atop the tip in the spinning position; ii) the apparatus comprises one or more gripping structures on an exterior surface of the inkwell; or iii) the inkwell comprises at least one vessel wall, and a vessel bottom generally opposite the opening, and wherein an interior surface of the inkwell defined by the at least one vessel wall comprises a plurality of ribs for deflecting stirred ink.

(Statement 17:) There is provided a method for using an apparatus, wherein the apparatus is defined according any one of Statements claims 1 to 9, and the support surface of the inkwell comprises the at least one tip engaging latch surface, and wherein the method comprises a step of: positioning the apparatus in the pooling position.

(Statement 18:) In an embodiment of the method of Statement 17, at least one of: i) the inkwell comprises a domed shaped surface for directing ink toward a edge of the dome shaped surface; or ii) a tip engaging latch surface of the at least one tip engaging latch surface comprises a groove that at least partially encircles the support surface of the inkwell to provide a selective pooling position.

(Statement 19:) In an embodiment of the method of Statement 17, the support surface of the inkwell further comprises the central region providing the tip engaging surface, and wherein the method further comprises the steps of, prior to step a): positioning the apparatus in the spinning position; and spinning the inkwell in the spinning position to stir ink in the inkwell.

(Statement 20:) In an embodiment of the method of Statement 19, at least one of: i) the support surface of the inkwell and the cap surface are cooperative in shape to facilitate spinning the inkwell atop the tip in the spinning position; ii) the apparatus comprises one or more gripping structures on the inkwell; or iii) the inkwell comprises at least one vessel wall, and a vessel bottom generally opposite the opening, and wherein an interior surface of the inkwell defined by the at least one vessel wall comprises a plurality of ribs for deflecting stirred ink.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers characteristics, compounds, chemical moieties or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

What is claimed is:

1. An apparatus comprising:

an inkwell defining an opening for ink and having a bottom exterior surface; and a cap for covering the inkwell in a storage position; and wherein:

the cap comprises a tip protruding from a cap surface; and the bottom exterior surfacer provides a support surface forming at least one tip engaging latch surface, each tip engaging latch surface spaced from a center of the support surface and dimensioned to receive the tip to tilt the apparatus to provide a pooling position for the ink.

2. The apparatus of claim 1, wherein each tip engaging latch surface comprises a groove that at least partially encircles the support surface of the inkwell to provide a selective pooling position.

3. The apparatus of claim 1, wherein the cap comprises a sealing ring to provide: a seal for the opening in the storage position; and a stabilising surface for the pooling position.

4. The apparatus of claim 1 having one or more gripping structures on an exterior surface of the inkwell.

5. The apparatus of claim 1, wherein the inkwell comprises a domed shaped surface to direct the ink toward an edge of the domed shaped surface.

6. The apparatus of claim 1, wherein the inkwell comprises at least one vessel wall, and a vessel bottom opposite the opening, and wherein an interior surface of the inkwell defined by the at least one vessel wall comprises a plurality of ribs for deflecting the ink as stirred.

7. The apparatus of claim 1, wherein the tip is located in a center of the cap.

8. The apparatus of claim 1, wherein a shape of the cap simulates a roof structure and a shape of the tip simulates a roof finial structure.

9. An apparatus comprising:

an inkwell defining an opening for ink and having a bottom exterior surface; and a cap for covering the inkwell in a storage position; and wherein:

the cap comprises a tip protruding from a cap surface; and the bottom exterior surfacer provides a support surface forming a central region providing a tip engaging surface dimensioned to receive the tip to provide a spinning position for the apparatus, and wherein the support surface of the inkwell and the cap surface are cooperative in shape to facilitate spinning the inkwell atop the tip in the spinning position.

10. A method for using an apparatus, wherein the apparatus is defined according claim 9, and the method comprises steps of:

a. positioning the apparatus in the spinning position; and b. spinning the inkwell to stir the ink in the inkwell.

11. The method of claim 10 comprising, prior to step a), positioning the cap on a second support surface.

12. The method of claim 10 comprising, after step b), using the ink in the inkwell.

13. The method of claim 12 comprising, after the step of using the ink, positioning the apparatus in the storage position.

14. The method of claim 10, wherein the support surface of the inkwell further comprises at least one tip engaging latch surface, each tip engaging latch surface dimensioned to receive the tip to provide a pooling position for the apparatus and wherein the method comprises, after step b), positioning the apparatus in the pooling position.

15. The method of claim 14, wherein at least one of:

i) the inkwell comprises a domed shaped surface for directing the ink to an edge of the dome shaped surface;

ii) a tip engaging latch surface of the at least one tip engaging latch surface comprises a groove that at least partially encircles the support surface of the inkwell to provide a selective pooling position;

iii) the support surface of the inkwell and the cap surface are cooperative in shape to facilitate spinning the inkwell atop the tip in the spinning position;

iv) the apparatus comprises one or more gripping structures on an exterior surface of the inkwell; or v) the inkwell comprises at least one vessel wall, and a vessel bottom opposite the opening, and wherein an interior surface of the inkwell defined by the at least one vessel wall comprises a plurality of ribs for deflecting the ink as stirred.

16. The method of claim 10, wherein at least one of:

i) the support surface of the inkwell and the cap surface are cooperative in shape to facilitate spinning the inkwell atop the tip in the spinning position;

ii) the apparatus comprises one or more gripping structures on an exterior surface of the inkwell; or iii) the inkwell comprises at least one vessel wall, and a vessel bottom opposite the opening, and wherein an interior surface of the inkwell defined by the at least one vessel wall comprises a plurality of ribs for deflecting the ink as stirred.

17. The apparatus of claim 9, wherein the support surface of the inkwell further forms at least one tip engaging latch surface, each tip engaging latch surface spaced from a center of the support surface and dimensioned to receive the tip to provide a pooling position for the ink.

18. The apparatus of claim 17, wherein each tip engaging latch surface comprises a groove that at least partially encircles the support surface of the inkwell to provide a selective pooling position.

19. A method for using an apparatus, wherein the apparatus comprises:

an inkwell defining an opening for ink and having a bottom exterior surface; and a cap for covering the inkwell in a storage position; and wherein:

the cap comprises a tip protruding from a cap surface; and the bottom exterior surfacer provides a support surface forming at least one tip engaging latch surface, each tip engaging latch surface dimensioned to receive the tip to tilt the apparatus to provide a pooling position for the ink; and wherein the method comprises a step of:

a. positioning the apparatus in the pooling position.

20. The method of claim 19, wherein at least one of:

i) the inkwell comprises a domed shaped surface for directing the ink toward an edge of the dome shaped surface; or ii) a tip engaging latch surface of the at least one tip engaging latch surface comprises a groove that at least partially encircles the support surface of the inkwell to provide a selective pooling position.

21. The method of claim 19, wherein the support surface of the inkwell further comprises the central region providing the tip engaging surface, and wherein the method further comprises the steps of, prior to step a):

positioning the apparatus in the spinning position; and spinning the inkwell in the spinning position to stir the ink in the inkwell.

22. The method of claim 21, wherein at least one of:

i) the support surface of the inkwell and the cap surface are cooperative in shape to facilitate spinning the inkwell atop the tip in the spinning position;

ii) the apparatus comprises one or more gripping structures on the inkwell; or iii) the inkwell comprises at least one vessel wall, and a vessel bottom opposite the opening, and wherein an interior surface of the inkwell defined by the at least one vessel wall comprises a plurality of ribs for deflecting the ink as stirred.

* * * * *